United States Patent [19]
Sherwood

[11] Patent Number: 5,824,125
[45] Date of Patent: *Oct. 20, 1998

[54] DUST COLLECTOR

[76] Inventor: Glen R. Sherwood, 14615 Paynes Creek Rd., Red Bluff, Calif. 96080

[*] Notice: This patent issued on a continued prosecution application filed under 37 CFR 1.53(d), and is subject to the twenty year patent term provisions of 35 U.S.C. 154(a)(2).

[21] Appl. No.: 674,064

[22] Filed: Jul. 1, 1996

[51] Int. Cl.$^6$ .................................................. B01D 46/02
[52] U.S. Cl. .................. 55/379; 55/483; 55/484; 55/496; 55/500; 55/502; 55/508; 55/DIG. 12
[58] Field of Search .............................. 55/379, 480, 483, 55/484, 492, 496, 500, 502, 508, DIG. 12

[56] References Cited

U.S. PATENT DOCUMENTS

| 235,197 | 12/1880 | Bean | 55/496 |
|---|---|---|---|
| 1,012,122 | 12/1911 | Budil | 55/379 |
| 3,550,359 | 12/1970 | Fisher et al. | 55/379 |
| 3,791,111 | 2/1974 | Kroll | 55/379 |
| 3,830,042 | 8/1974 | MacDonnell | 55/379 |
| 4,089,664 | 5/1978 | Noland | 55/379 |
| 4,746,339 | 5/1988 | Millard | 55/379 |
| 4,808,203 | 2/1989 | Sabourin | 55/492 |

FOREIGN PATENT DOCUMENTS

| 240893 | 11/1911 | Germany | 55/496 |
|---|---|---|---|
| 296128 | 1/1917 | Germany | 55/496 |
| 296903 | 3/1917 | Germany | 55/496 |
| 308764 | 11/1918 | Germany | 55/496 |
| 340615 | 9/1921 | Germany | 55/492 |
| 3948 | 2/1913 | United Kingdom | 55/379 |
| 8260 | 4/1914 | United Kingdom | 55/379 |

Primary Examiner—C. Scott Bushey
Attorney, Agent, or Firm—Olson & Olson

[57] ABSTRACT

A dust collector includes a hollow housing having a bottom solids outlet, a top clean air outlet and an intermediate dust laden air inlet. A plurality of vertically elongated filter assemblies are mounted in spaced relation within the housing. Each filter assembly includes an open framework covered by a sheet of filter material in the form of a glove that converges downwardly from the open upper end to a closed end engaged by a tensioning nose bar which serves to stretch the glove over the framework. Dust laden air enters the inlet, passes downward to the bottom ends of the filter assemblies, thence upward to the filter assemblies where the dust and other particulates are collected on the outer side of the filter sheets and the air passes through the filter sheet and upward into the top clean air outlet. The particulates collected on the filter sheet periodically are released therefrom and gravitate downward into the bottom solids outlet for removal.

2 Claims, 4 Drawing Sheets

DUST COLLECTOR

BACKGROUND OF THE INVENTION

This invention relates to dust collectors, and more particularly to a novel construction thereof.

The dust collector of this invention is similar in basic performance to the collector disclosed in U.S. Pat. No. 4,808,203 which encloses in a container a plurality of spaced apart frames supporting filter cloth material stretched over their outer sides. The cloth filter material is a single elongated sheet that is secured at one end to the outer top side of one end frame and then is weaved downward and upward over each consecutive frame, being secured at its opposite end to the outer top side of the opposite end frame. A fabric stretcher mechanism between adjacent pairs of frames pulls upwardly on the fabric to effect stretching the fabric tightly over each frame. Cleaning requires disassembly of the entire stretcher mechanism and removal of the large and heavy one-piece fabric sheet.

SUMMARY OF THE INVENTION

The dust collector of this invention is formed of a plurality of separate frames each having a separate filter sheet stretched over it, and a supporting deck defining a plurality of spaced slots each configured to receive one of the frames. An airtight seal is interposed between each filter sheet and deck to isolate the dust laden air input from the clean air output.

It is the principle objective of this invention to provide a dust collector of the class described that affords collection of dust and other particulates on a plurality of separate filter units mounted for separate removal and installation on a deck within a container.

Another objective of this invention is the provision of a dust collector of the class described that is of simplified construction for economical manufacture, assembly and cleaning, and minimum maintenance.

A further objective of this invention is to provide a dust collector of the class described in which tensioning means is provided on each frame for stretching the fabric sheet thereover.

The foregoing and other objects and advantages of this invention will appear from the following detailed description, taken in connection with the accompanying drawings of a preferred embodiment.

DESCRIPTION OF THE PREFERRED EMBODIMENT

Figure 1:
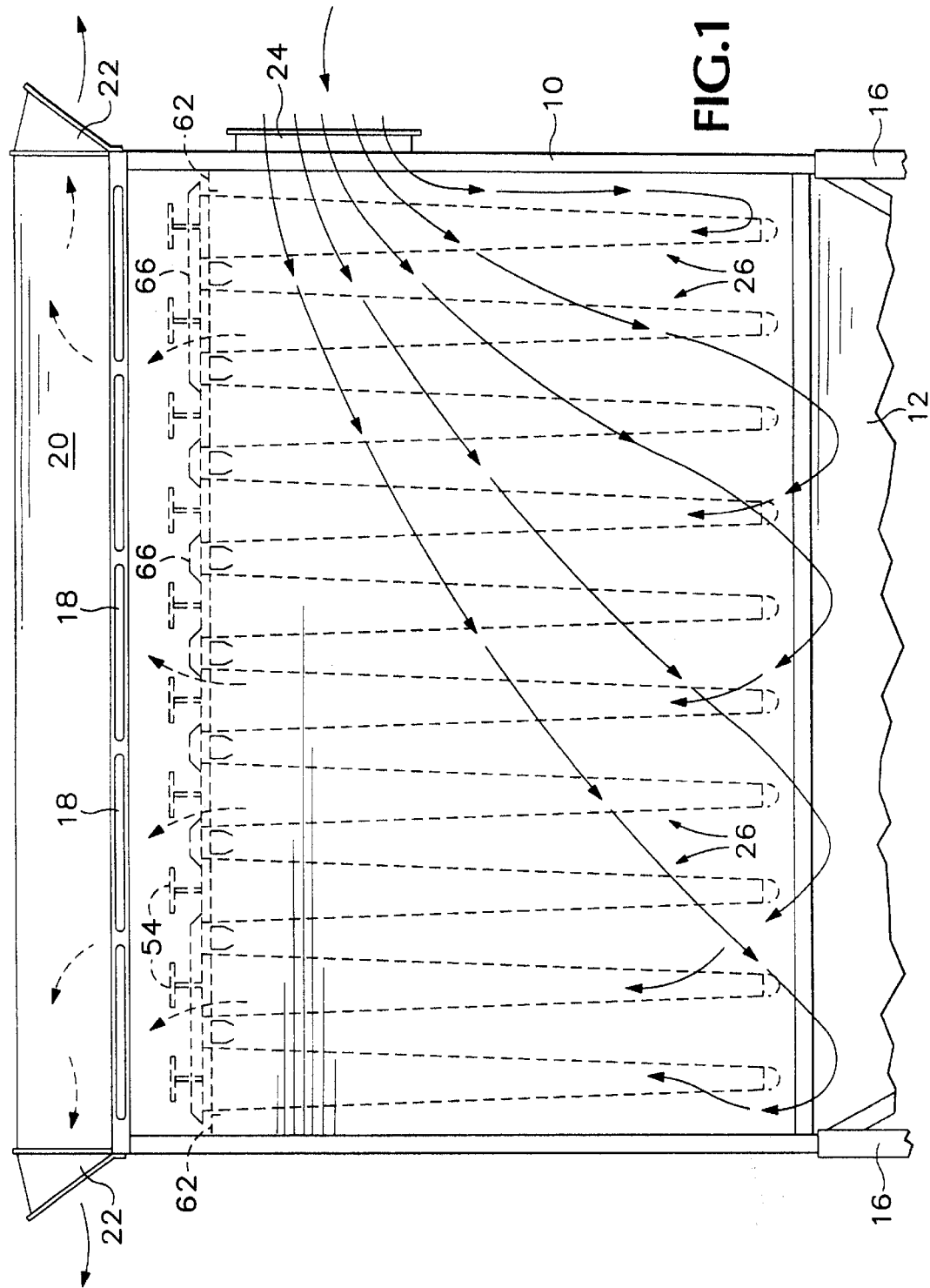
FIG. 1 is a fragmentary side elevation of a dust collector embodying the features of this invention, the plurality of separate filter assemblies being shown in broken lines.
Figure 2:
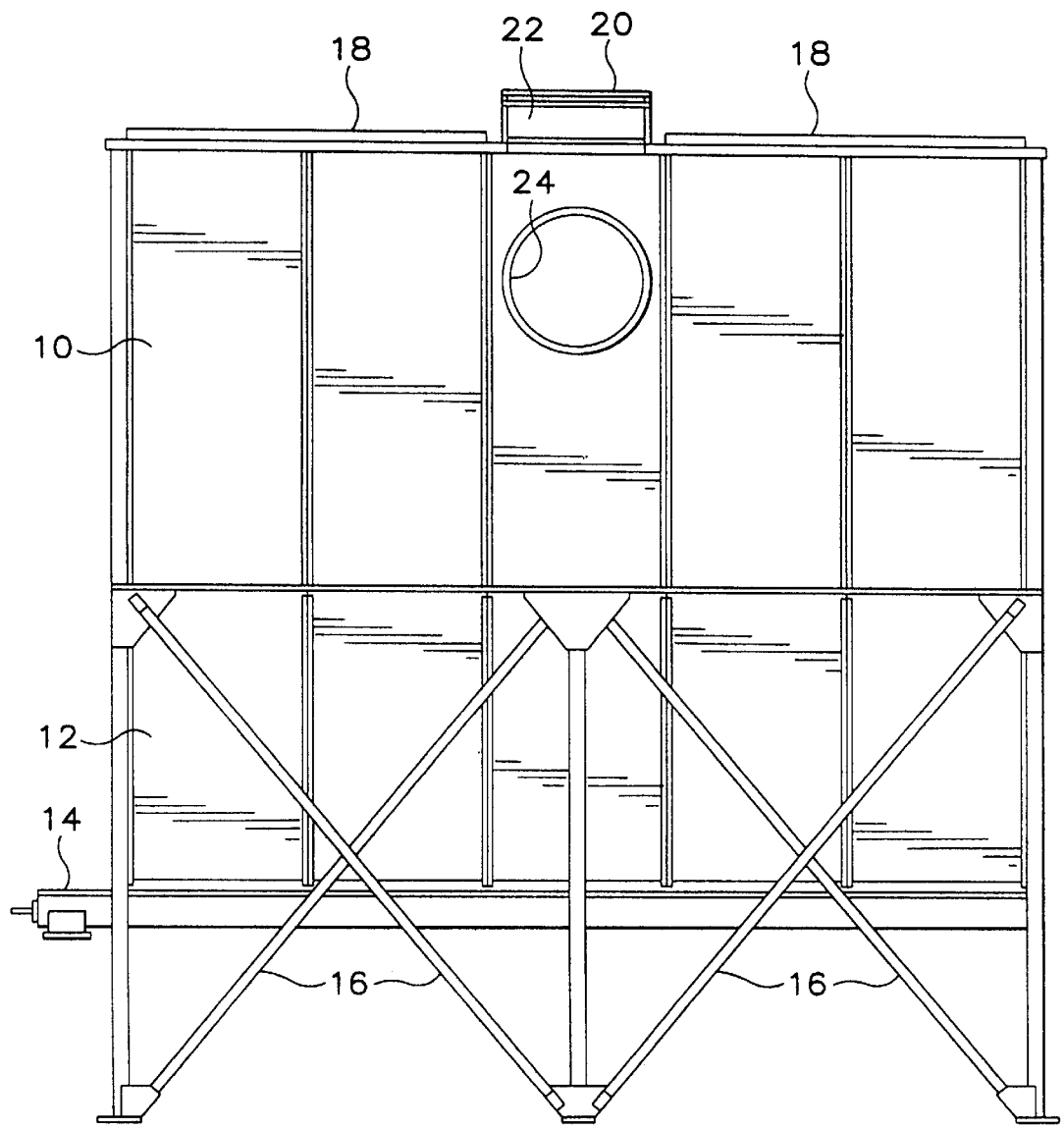
FIG. 2 is a front elevation as viewed from the right in FIG. 1.

Referring primarily to FIGS. 1 and 2 of the drawings, the dust collector of this invention includes a filter housing 10 coupled at its lower end to a solids collection hopper 12 the side walls of which converge downwardly to an elongated laterally extending screw conveyor 14. Dust and other solid particulates entering the expansion area gravitate into the hopper and are delivered by the screw conveyor to suitable means for hauling away to a desired site of deposit. A suitable support frame 16 supports the housing and hopper in upright position.

The filter housing 10 is removably closed at its upper end by a plurality of doors 18 which are arranged for removal to gain access to the interior of the housing. The doors are disposed on opposite sides of a centrally located clean air collection housing 20 provided at its opposite ends with clean air discharge outlets 22.

Intermediate the top and bottom ends of the filter housing 10 an inlet opening 24 is provided in the front wall of the housing through which dust laden air is delivered into the interior of the housing for processing by a plurality of filter assemblies 26 which extend vertically and are spaced apart between the front and back walls of the housing. In the embodiment illustrated, two rows of filter assemblies are spaced apart laterally in the housing on opposite sides of the central vertical plane through the clean air collection housing 20. The embodiment illustrated thus provides several separate filter assemblies within the housing.

The space in the housing between the doors 18 and the top ends of the filter assemblies 26 also serves as part of the clean air collection housing 20.

Each filter assembly includes a filter cage 28 (FIG. 4) formed of a plurality of laterally spaced apart, vertically extending plates 30 each provided with a multiplicity of openings 32 which serve the dual purpose of minimizing the weight of the plates and of allowing free passage of air. The upper ends of the vertical plates are secured to a top peripheral angle iron frame 34. Cross bars 36 extend across the angle iron frame between adjacent vertical plates 30, for a purpose to be described hereinafter. A central stabilizer bar 38 extends through the spaced apart vertical plates 30, and the bottom ends of the plates 30 are secured between bottom spacer bars 40. A plurality of vertically spaced support rods 42 extend across the outer sides of the vertical plates and serve as backing support for filter sheet material to be described hereinafter.

Figure 4:
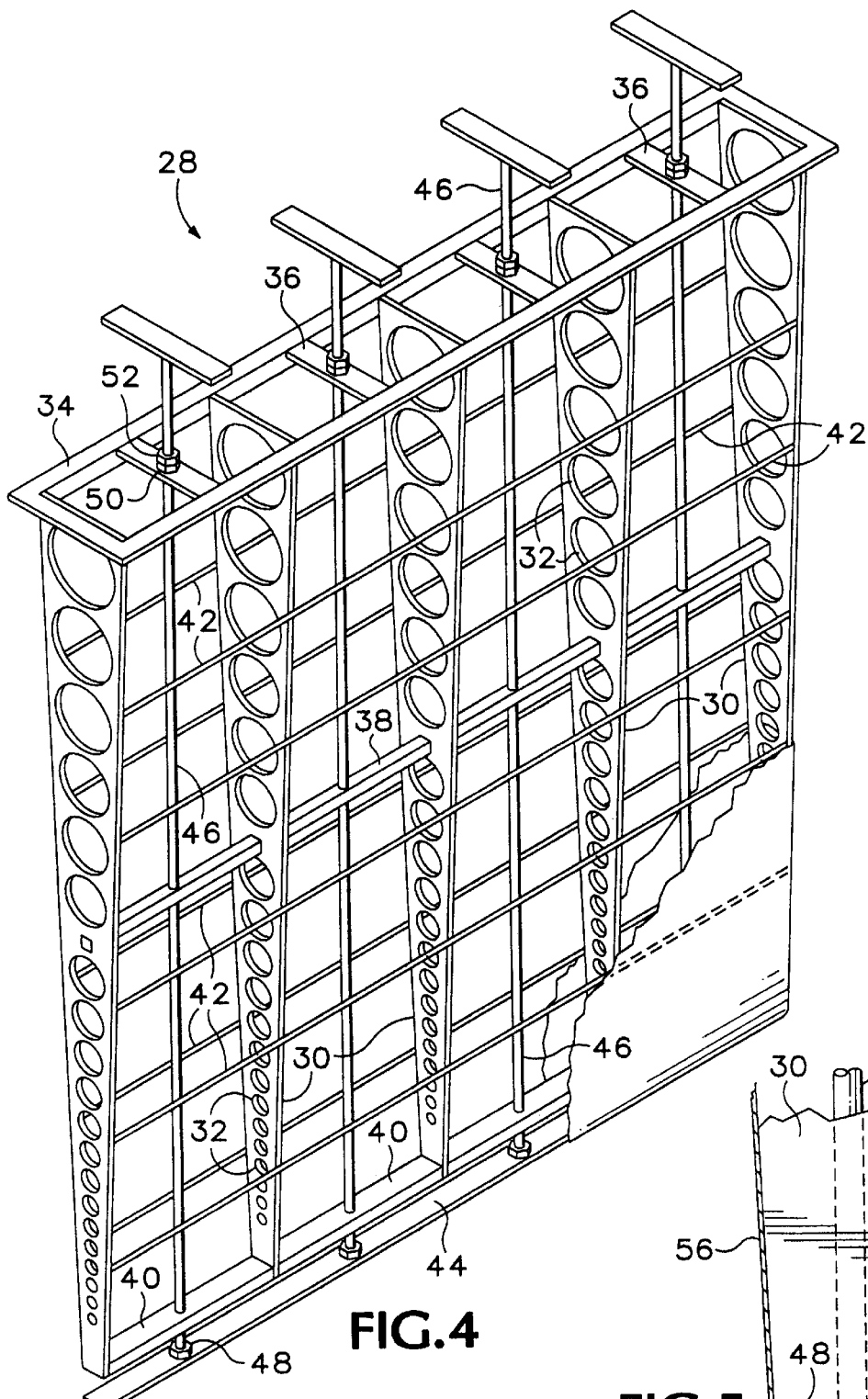
FIG. 4 is a perspective view of one of the filter cages shown in FIG. 1, the filter sheet material being broken away to disclose structural details of the cage.
Figure 5:
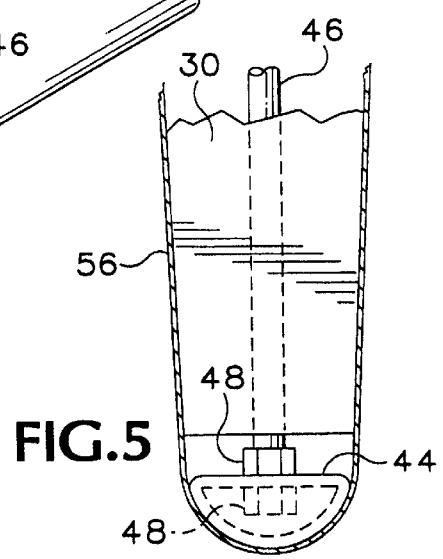
FIG. 5 is a fragmentary vertical section, on an enlarged scale, of the lower end of one of the filter cages showing the filter sheet tensioning nose bar in operative position.

Extending across the filter cage below the bottom spacer bars 40 is an elongated filter sheet tensioning nose bar 44. It is supported at laterally spaced position at the bottom end of a plurality of laterally spaced, vertically extending support rods 46 which are connected to the nose bar by the attaching nuts 48 (FIG. 4). The support rods extend upwardly through aligned openings in the center stabilizer bar 38 and cross bars 36. The upper end portion of the support rods are threaded and extend through the threaded adjustment nuts 50 which are secured against rotation to the cross bars 36. A lock nut 52 serves to secure the support rod against rotation from a desired position of rotational adjustment. Rotational adjustment is accommodated by a handle 54 at the upper end of the support rod.

The filter cage serves to support a sheet of filter material 56 selected to prevent dust and other particulate material from passing through the sheet. In the preferred embodiment illustrated, the filter sheet is formed as a glove closed at its bottom and sides and open at its top end. The top end of the glove incorporates an upper perimeter seal of resilient material such as rubber or synthetic thermoplastic resin. The seal is integrated with the upper open end of the glove as by the double hem 60.

Figure 3:
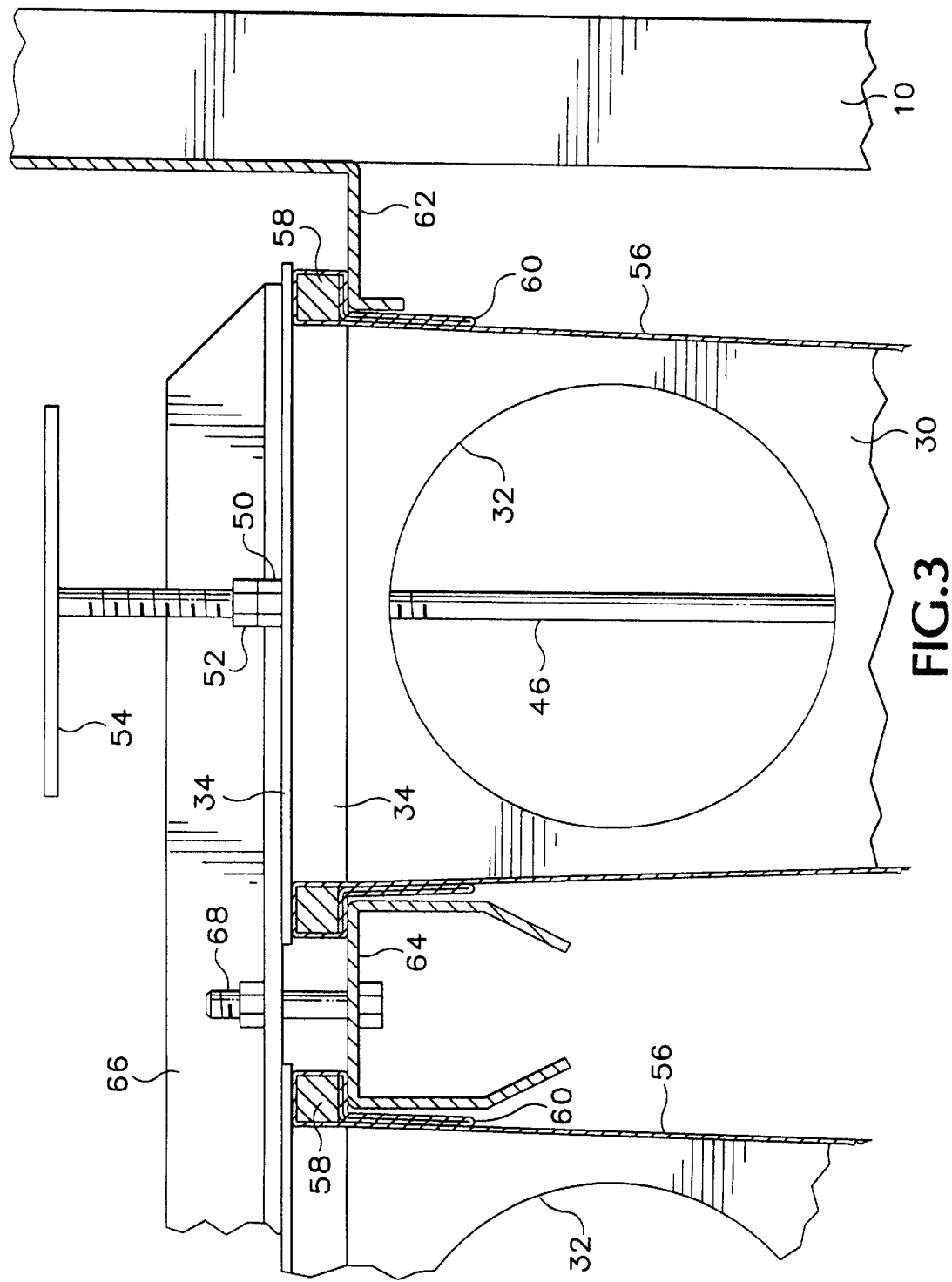
FIG. 3 is a fragmentary sectional view, on an enlarged scale, of the right side portion of FIG. 1.

The filter sheet glove is secured about the filter cage by seating the upper perimeter seal 58 within the top peripheral angle iron frame 34. The cage with surrounding filter sheet glove is installed within the filter housing 10 by seating the perimeter seal 58 upon a supporting grid within the housing. Referring to FIG. 3 of the drawings, the supporting grid is formed by a flange 62 at each of the opposite ends of the filter housing 10, and a plurality of support rails 64 secured at their opposite ends to the housing 10 and positioned in spaced apart relationship between the end flanges 62. Thus, a filter assembly at one end of the housing 10 is extended downwardly between the end flange 62 and the adjacent rail 64, with the perimeter seal 58 resting thereupon. The next adjacent filter assembly is supported between the rail 64 that supports the end filter assembly, and the next adjacent rail. Additional filter assemblies are supported in like manner within the housing 10, as illustrated in FIG. 1 of the drawings.

An airtight seal is provided at the upper end of each filter assembly by an angle iron clamp 66 which overlies the top peripheral angle iron frame 34 and applies downward compression on the peripheral seal 58, to ensure an airtight seal between the filter glove and the support grid. Downward clamping pressure for the angle iron clamps 66 is provided by the clamp bolts 68 which extend through the support rails 64 and the angle iron clamps 66.

The filter glove 56 is stretched tightly against the filter cage by means of the tensioning nose bar 44 which bears against the bottom end of the glove. The nose bar may be moved downward to effect stretching of the glove, by loosening the lock nut 52 on each support rod 46 and rotating the handle 54 to move the nose bar downward against the bottom end of the glove sufficiently to provide the desired tensioning of the glove.

The dust collector described hereinbefore functions to pass dust laden air, introduced through inlet 24 by any method, downward and around the spaced filter assemblies 26, thence upward through the filter sheet material 56, as indicated by the arrows in FIG. 1. The dust particles and other solid particulates are retained on the outer side of the filter sheets from which they drop by gravity into the collection hopper 12 for ultimate removal through the air lock of the screw conveyor 14.

The air, cleaned of dust and other particulates, passes upward through the interior of the filter assemblies into the clean air collection chamber 20 and thence outward through the outlets 22.

When it is desired to clean the dust collection system, the filter housing top doors 18 are removed to expose the support structure for the filter assemblies 26. The angle iron clamp bolts 68 and angle irons 66 associated with the chosen filter assemblies 26 to be cleaned, are removed. Then, while the seal 58 is held by hand against the top peripheral frame 34, the filter assembly is raised from the flanges 62 and rails 64 and removed from the housing 10 for vacuum or other form of cleaning. The cleaned assembly is returned to the housing by reversing the foregoing procedure, i.e. by holding the seal 58 against the frame 36 and lowering the assembly into supporting engagement with the flanges 62 and rails 64. If necessary, the nose bar 44 may be readjusted to stretch the fabric sheet glove 56.

From the foregoing, it will be apparent that the dust collector of this invention is of simplified construction for economical manufacture, assembly and disassembly, by virtue of the independent filter assemblies 26.

Selected ones of the filter assemblies may be removed for cleaning or repair. Those removed may be replaced with fresh filter assemblies to minimize the down time of the collector.

It will be apparent to those skilled in the art that various changes may be made in the size, shape, type, number and arrangement of parts described hereinbefore. For example, the size of the dust collector may be provided in a wide range of capacities. A typical industrial dust collector may have several filter assemblies each having a width of about 8 feet and a height of about 8 to 12 feet and supported with the housing in groups disposed end-to-end across the housing. Although the preferred shape of the filter assembly is the V-shape illustrated in FIG. 1, other shapes may be chosen as desired. Various well known and commercially available types of filter sheet material may be selected for particular filtration needs. Dust laden air may be introduced through the inlet 24 by pressure delivery to the inlet or by applying vacuum at the clean air outlets. These and other changes may be made, as desired, without departing from the spirit of this invention and the scope of the appended claims.

I claim:

1. A dust collector, comprising:

a) a hollow housing having a top clean air outlet, a bottom particulate solids outlet and an intermediate air inlet for solids-laden air to be cleaned, b) a plurality of vertically and horizontally elongated filter assemblies mounted vertically in spaced apart relation in the housing, each filter assembly comprising:

1. a framework having open sides and top end and tapered substantially uniformly downward to narrower dimension at the bottom end than at the top end, 2. a sheet of filter fabric material configured in the form of a glove that removably covers the tapered sides and bottom of the framework, 3. seal means surrounding the top end of the framework, c) support means in the housing releasably engaging the seal means and releasably supporting the filter assemblies in said housing, d) a nose bar disposed along the bottom of the framework within said fabric glove and engaging the inner side of the bottom of the glove, and e) operating means extending from the top of the framework downward within said framework and engaging said nose bar, the operating means being operable at its upper end to move the nose bar relative to the framework and against the inner surface of said fabric glove to vary the degree of stretching of the fabric glove over the framework.

2. The dust collector of claim 1 wherein the operating means includes elongated screw means mounted on the framework for axial rotation and simultaneous vertical movement, the bottom end of the screw means engaging the nose bar and the top end of the screw means having operating means for rotating the screw means.

\* \* \* \* \*